May 15, 1951   G. B. SMITH   2,553,118
SELECTIVE SPEED CONTROL FOR MOTOR VEHICLES
Filed April 22, 1948   2 Sheets-Sheet 1
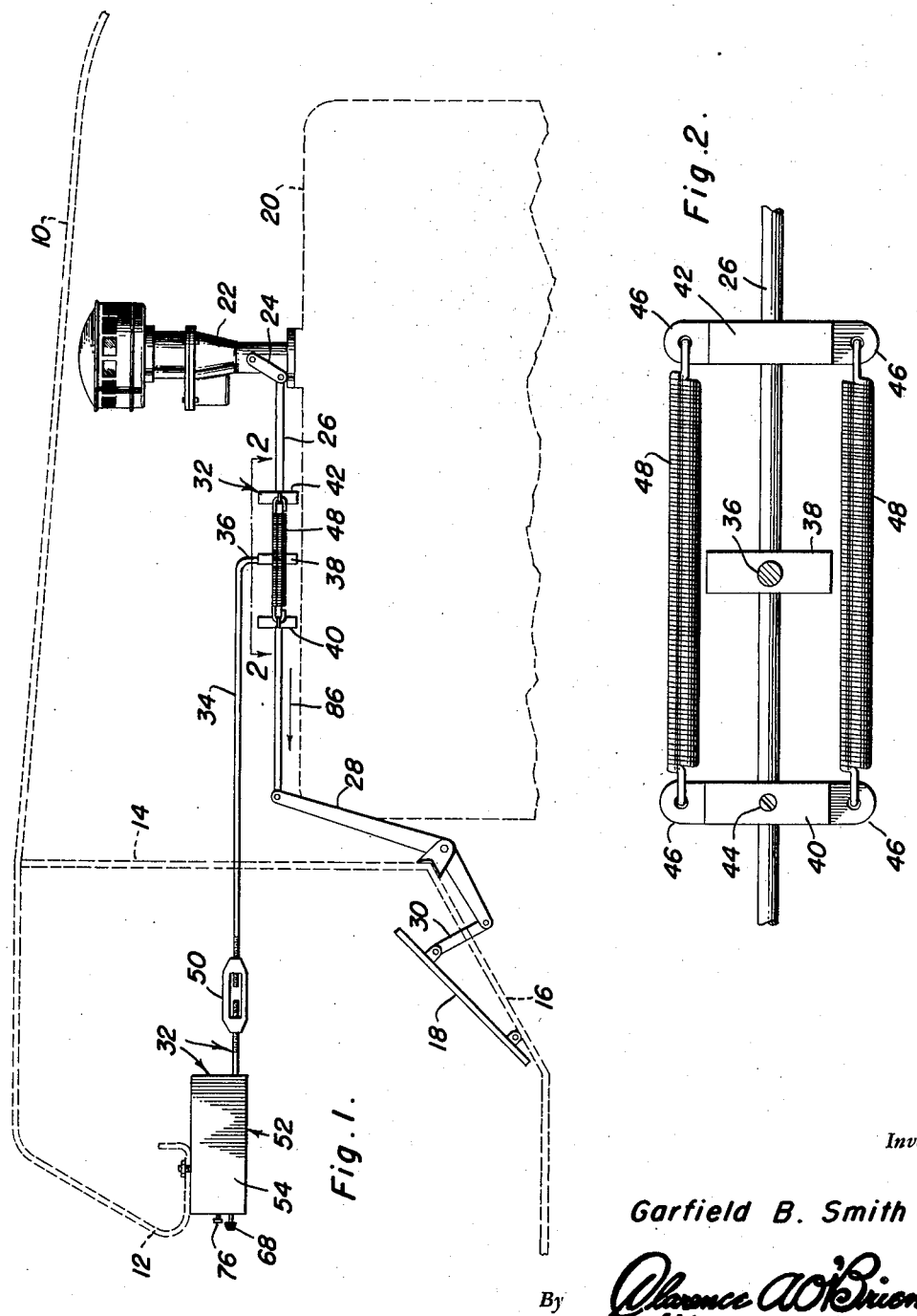
Inventor
Garfield B. Smith
By Clarence A. O'Brien
and Harvey B. Jackson
Attorneys May 15, 1951  G. B. SMITH  2,553,118
SELECTIVE SPEED CONTROL FOR MOTOR VEHICLES
Filed April 22, 1948  2 Sheets-Sheet 2
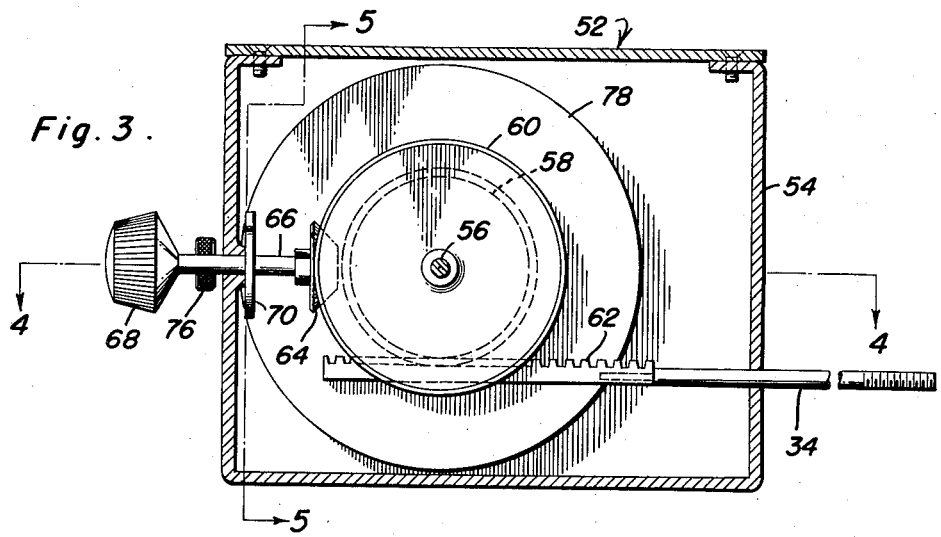
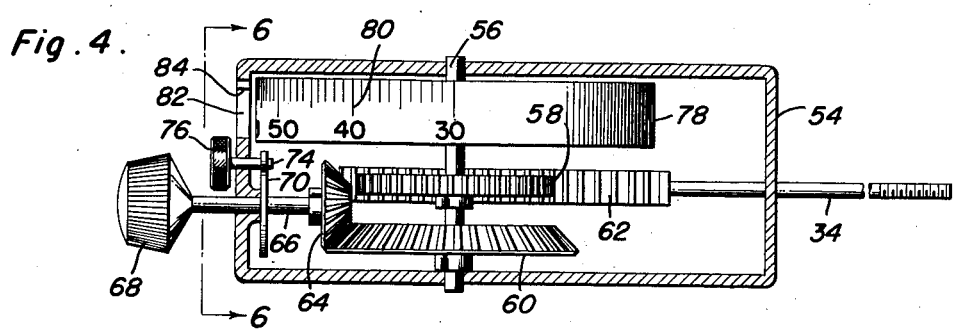
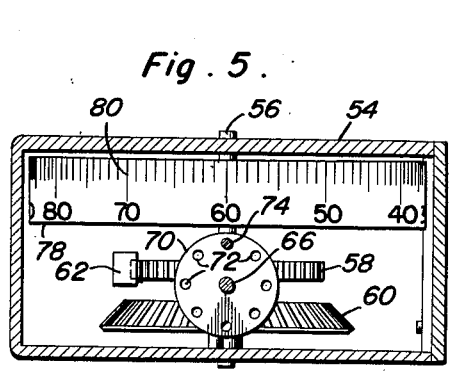
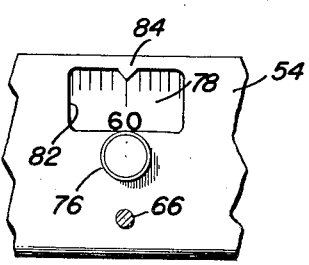
Inventor
Garfield B. Smith
By *Clarence A. O'Brien and Harvey B. Jacobson*
Attorneys Patented May 15, 1951

2,553,118

UNITED STATES PATENT OFFICE 2,553,118

SELECTIVE SPEED CONTROL FOR MOTOR VEHICLES

Garfield B. Smith, Sandusky, Mich.

Application April 22, 1948, Serial No. 22,647

3 Claims. (Cl. 74—526)

This invention relates to new and useful improvements and structural refinements in speed controls for motor vehicles, particularly automobiles, and the principal object of the invention is to enable the operator to control the speed of the vehicle engine in an easy, conventional manner until a certain, predetermined rate of speed is attained, after which depressing of the accelerator pedal so as to further increase the speed of the vehicle will be more difficult, that is to say, expenditure of a relatively greater effort will be required to depress the accelerator pedal after the predetermined rate of speed has been attained.

This object is achieved by the provision of a selective speed control device which is intended for association with the throttle linkage of the engine, this device including what may be referred to as a selector head conveniently mounted in the driver's compartment and provided with a speed adjustment indicator, matters being so arranged that the selector head may be set with the reading of the indicator corresponding to a predetermined rate of speed at which the device becomes effective in resisting downward pressure upon the accelerator pedal.

It will be apparent from the foregoing that the primary advantage of the invention resides in the factor of safety which it provides, secondly, in its ability to indicate to the driver that a predetermined speed has been attained (without the necessity of the driver observing the speedometer) and thirdly, in providing, in the form of the conventional accelerator pedal, a foot support for the driver, on which he may conveniently rest his foot when a predetermined speed has been attained.

A further advantage of the invention resides in its adaptability to convenient installation on the existing throttle linkage of the engine, without the necessity of completely disassembling or mutilating the same.

An additional feature of the invention lies in its simplicity of construction and in its adaptability to motor vehicles of various types.

With the above more important objects and features in view, and such other objects and features as may become apparent as this specification proceeds, the invention consists essentially of the arrangement and construction of parts as illustrated in the accompanying drawings, in which:

Figure 1 is a side elevational view of the invention in association with throttle linkage of an automobile engine, the latter as well as a portion of the automobile being shown in phantom lines;

Figure 2 is a cross-sectional view, taken substantially in the plane of the line 2—2 in Figure 1;

Figure 3 is a horizontal cross-sectional view of a selector head used in the invention;

Figure 4 is a cross-sectional view taken substantially in the plane of the line 4—4 in Figure 3;

Figure 5 is a cross-sectional view, taken substantially in the plane of the line 5—5 in Figure 3; and Figure 6 is a cross-sectional view, taken substantially in the plane of the line 6—6 in Figure 4.

Like characters of reference are employed to designate like parts in the specification and throughout the several views.

Referring now to the accompanying drawings in detail, the reference character 10 designates a motor vehicle such as an automobile, including an instrument panel 12, a cowl bulk head or fire wall 14, floor board 16 and a conventional accelerator pedal 18.

The engine 20 of the vehicle 10 is equipped with a carburetor 22, this being provided with a throttle lever 24 connected by a longitudinally shiftable link 26 to a rocker arm 28 which, in turn, is operatively connected as at 30 to the aforementioned pedal 18.

The structure thus far described is, of course, of a conventional nature, and the invention resides in the provision of a selective speed control device designated generally by the reference character 32.

The device 32 embodies in its construction a longitudinally shiftable rod 34 which is disposed in parallelism to the link 26 and extends slidably through the bulk head 14 as is indicated in Figure 1.

The "engine" end portion of the rod 34 is laterally angulated as at 36 and is provided with what may be referred to as a stop lug 38. This lug is formed with an aperture or recess (not shown) so that it may slidably engage the link 26, and it is also to be noted that the link 26 carries a stationary element 40 and a slidable element 42.

These two elements are disposed at the relatively opposite sides of the lug 38, the element 40 being secured to the link 26 by a set screw 44 and both elements being provided in opposite portions 46 thereof with suitable apertures so that the end portions of a pair of tension springs 48 may be anchored thereto, substantially as shown. It is to be noted that the springs 48 connect together the elements 40, 42, but it should be understood that the springs, when not under tension, are sufficiently long to permit the elements to be disposed at a substantial distance from each other.

The rod 34, in effect, consists of two longitudinally aligned sections and means, such as a turnbuckle 50 is provided for adjusting the overall length of the rod, for a purpose hereinafter described.

A selector head designated generally by the reference character 52 is used for longitudinally shifting the rod 34, this head including in its construction a suitable housing 54 secured to the aforementioned instrument panel 12, so that it is conveniently accessible to the driver.

A transverse shaft 56 is rotatably journaled in the housing 54 and carries, inter alia, a pinion 58 and a large bevel gear 60. The rod 34 extends slidably into the housing 54 and is provided with a rack strip 62, the latter being in operative engagement with the pinion 58 so that a rotary movement of the pinion will impart a longitudinal sliding movement to the rack strip and, by virtue thereof, to the rod 34.

The bevel gear 60 meshes with a relatively small bevel gear 64, the latter being secured to a shaft 66 which is rotatably journaled in and projects outwardly from the housing 54, carrying at its outer end a suitable control knob 68.

The shaft 66 also carries a disk 70 formed with a plurality of spaced apertures 72 in which is selectively receivable a locking pin 74 slidable in the housing 54. The pin 74 projects outwardly from the housing and carries a button 76, matters being so arranged that by pushing the button inwardly, the pin 74 may be selectively engaged with the apertures 72 and the disk 70, together with the associated gear train 58, 62, 60, 64 are prevented from actuation by movement of the control knob 68. In other words, the rod 34 cannot be longitudinally shifted by turning the knob 68 until the button 76 is pulled outwardly so as to withdraw the locking pin 74 from the apertures 72 of the disk 70.

Finally, a circular speed adjustment indicator 78, suitably graduated as at 80 in accordance with different rates of speed, is secured to the shaft 56 in the housing 54, the latter being provided with a sight opening 82 and with a pointer 84, with respect to which the graduations on the indicator may be read.

Having thus described the construction of the invention, its method of operation will now be explained.

Assuming the device to be in the position shown in Figure 1, depression of the accelerator pedal 18 will shift the link 26 in the direction of the arrow 86, thereby opening the throttle in the carburetor 22 and permitting the vehicle to gain speed.

Assuming further that the selector head 52 is "set" at 60 moles per hour, as indicated in Figure 6, the link 26 will shift freely in response to normal, easy depression of the pedal 18 and the elements 40, 42 together with the springs 48 will shift in unison with the link until the element 42 is brought in engagement with the stop lug 38 when the predetermined speed of 60 miles per hour is attained.

Thereupon, the element 42 will be prevented by the lug 38 from moving further in the direction of the arrow 86, but if downward pressure continues to be exerted on the pedal 18, the distance between the elements 40, 42 will increase and the springs 48 will become stretched. Accordingly, heretofore absent resilient resistance will present itself to further downward pressure on the pedal 18 after the predetermined rate of speed has been attained. It should, of course, be understood that the rate of speed at which this resistance becomes effective may be pre-adjusted by simply unlocking the pin 74 and rotating the knob 68 as already described, the "setting" of the selector head being readily determined by simply observing the indicator 78.

Moreover, by simply turning the buckle 50 so as to adjust the overall length of the rod 34, the initial position of the stop lug 38 between the collars 40, 42 may be varied, thereby facilitating initial calibration of the control device. Needless to say, once calibrated upon installation in a given vehicle, the adjustment of the turnbuckle 50 of the control device need not be disturbed.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In association with a motor vehicle engine having a longitudinally shiftable throttle link and an accelerator pedal operatively connected thereto, a selective speed control comprising a longitudinally shiftable rod parallel to said link, a stop lug on said rod, a stationary element and a slidable element provided on said link at the opposite sides of said lug, a tension spring connecting said elements together, said slidable element being engageable with said stop lug, means for longitudinally shifting said rod, means for locking said rod in a predetermined position, and means for varying the length of said rod.

2. The device as defined in claim 1, wherein said stop lug slidably engages said link intermediately of said elements.

3. In association with an internal combustion engine having a longitudinally shiftable throttle link, a selective speed control comprising a stationary element and a slidable element provided on said link in spaced relation, resiliently yieldable means connecting said elements together, an adjustable stop positioned between said elements and engageable by the slidable element upon sliding of said rod, and means for adjusting the position of said stop relative to said elements.

GARFIELD B. SMITH.

REFERENCES CITED

The following references are of record in the file of this patent:

UNITED STATES PATENTS

| Number | Name | Date |
|---|---|---|
| 1,833,235 | Slocumb | Nov. 24, 1931 |
| 2,186,620 | Aprea | Jan. 9, 1940 |
| 2,209,044 | Thiele | July 23, 1940 |
| 2,240,919 | Weintraub | May 6, 1941 |
| 2,295,897 | Gillespie | Sept. 15, 1942 |
| 2,340,393 | Leishman | Feb. 1, 1944 |
| 2,358,597 | Russell | Sept. 19, 1944 |